(12) United States Patent
Proux

(10) Patent No.: US 6,286,903 B1
(45) Date of Patent: Sep. 11, 2001

(54) SEAT CUSHION IN PARTICULAR FOR AUTOMOBILE VEHICLES AND METHOD OF MANUFACTURING IT

(75) Inventor: Georges Proux, Viroflay (FR)

(73) Assignee: Sofitec, Buc (FR)

( * ) Notice: Subject to any disclaimer, the term of this patent is extended or adjusted under 35 U.S.C. 154(b) by 0 days.

(21) Appl. No.: 09/452,392

(22) Filed: Dec. 1, 1999

(30) Foreign Application Priority Data

Dec. 8, 1998 (FR) .................................................. 98 15567

(51) Int. Cl.⁷ ...................................................... A47C 7/18
(52) U.S. Cl. ................. 297/452.26; 297/452.55; 297/452.61; 297/DIG. 1; 5/740
(58) Field of Search ........................ 297/452.26, 452.55, 297/452.61, DIG. 1; 5/740, 653, 699

(56) References Cited

U.S. PATENT DOCUMENTS

| | | | |
|---|---|---|---|
| 3,713,697 | * 1/1973 | Koepke | 297/452.61 |
| 4,561,695 | * 12/1985 | MacCready | 297/452.55 |
| 4,699,427 | * 10/1987 | Kobayashi | 297/452.61 X |
| 4,726,623 | * 2/1988 | Kazaoka et al. | 297/452.55 X |
| 4,740,260 | 4/1988 | Selbert et al. . | |
| 4,781,417 | * 11/1988 | Shipman et al. | 297/452.55 X |
| 4,784,437 | * 11/1988 | Shimada | 297/452.61 |
| 4,795,215 | * 1/1989 | Shimada | 297/452.61 X |
| 4,833,741 | * 5/1989 | Mizuno et al. | 297/452.61 X |
| 4,834,451 | * 5/1989 | Meunier et al. | 297/452.55 X |
| 4,840,430 | * 6/1989 | Shimada | 297/452.61 |
| 4,893,873 | * 1/1990 | Iwamoto et al. | 297/452.26 |
| 5,016,941 | * 5/1991 | Yokota | 297/452.61 |
| 5,089,191 | 2/1992 | Hughes . | |
| 5,269,590 | * 12/1993 | Carilli | 297/DIG. 1 |
| 5,295,732 | 3/1994 | Boisset . | |
| 5,336,708 | * 8/1994 | Chen | 297/DIG. 1 X |
| 5,513,899 | * 5/1996 | Michaels | 297/452.55 X |
| 5,544,942 | * 8/1996 | Vu Khac et al. | 297/452.61 X |
| 5,850,645 | * 12/1998 | Ogawa et al. | 297/452.61 X |
| 5,882,073 | * 3/1999 | Burchi et al. | 297/DIG. 1 X |
| 6,070,939 | * 6/2000 | Matsuo et al. | 297/452.55 X |
| 6,158,815 | * 12/2000 | Sugie et al. | 297/452.61 |

FOREIGN PATENT DOCUMENTS

| | | |
|---|---|---|
| 347115 | 12/1989 | (EP) . |
| 401982 | 12/1990 | (EP) . |
| 634303 | 1/1995 | (EP) . |

* cited by examiner

Primary Examiner—Peter M. Cuomo
Assistant Examiner—Rodney B. White
(74) Attorney, Agent, or Firm—Laubscher & Laubscher

(57) ABSTRACT

A seat cushion, in particular for folding automobile vehicle seat, and its method of manufacture, the cushion having a lower face adapted to be in contact with a supporting frame and covered with a protective film of expanded synthetic plastic material that is resistant to wear and adheres to the expanded synthetic plastic material of the cushion.

12 Claims, 1 Drawing Sheet

SEAT CUSHION IN PARTICULAR FOR AUTOMOBILE VEHICLES AND METHOD OF MANUFACTURING IT

BACKGROUND OF THE INVENTION

1. Field of the Invention

The present invention relates to a seat cushion, in particular for automobile vehicles, essentially made of an expanded synthetic plastic material, such a polyurethane foam or the like.

2. Description of the Prior Art

A cushion of this type is generally associated with a supporting frame formed by a metal grid which is pressed onto the lower face of the cushion or embedded in the expanded material thereof.

A cover of woven fabric or the like covers the upper face and the sides of the cushion and is fixed, usually stapled, to the frame, whether the latter is applied to the lower face of the cushion or embedded in the expanded material thereof (in which case parts of the frame are flush with the surface of the cushion and provide stapling points).

The lower face of the cushion is generally covered with a protective film (because the foam is mechanically weak) which is simply held between the frame and the cushion when the frame is external to the cushion or which is fixed with the cover to the parts of the frame provided for this purpose when the latter is embedded in the material of the cushion.

In all cases the protective film is not fixed directly to the cushion and can therefore move relative to it, becoming locally deformed and taking on a less than perfect esthetic appearance, giving the impression of defective manufacture. This is particularly important when the cushion forms the seat cushion of a folding automobile vehicle seat because the lower face of the cushion is substantially vertical and clearly visible when the seat is in the folded position, which is prejudicial to the brand image of the vehicle and its manufacturer.

OBJECT OF THE INVENTION

The object of the invention is to provide a simple, effective and inexpensive solution to the above problem.

SUMMARY OF THE INVENTION

For this purpose, the present invention provides a seat cushion, made of an expanded synthetic plastic material and having a lower face associated with a supporting frame, wherein at least part of the lower face of the cushion is covered with a protective film of synthetic plastic material that is resistant to wear and adheres to the expanded synthetic plastic material of the cushion.

The adherence of the film to the expanded plastics material of the cushion and its resistance to abrasion guarantee a long service life of the cushion, the lower face of which retains a clean and defect-free appearance. When the supporting frame is applied to the lower face of the cushion, the film is interposed between the supporting frame and the expanded material of the cushion, it mechanically protects the expanded material from damage that could be caused by the frame and reduces or eliminates the noise that could otherwise be caused by the material of the cushion rubbing on the frame or on the floor of the vehicle.

When the supporting frame is embedded in the plastics material of the cushion near the lower face thereof, the film covers the lower face of the cushion and protects it from any damage.

In a preferred embodiment of the invention, this film is made of an expanded plastics material and is heat-formed.

The expanded material is preferably a chemically reticulated polyethylene having a density in the range from approximately 70 kg/m$^3$ to approximately 120 kg/m$^3$.

This constitutes an excellent compromise between the weight, thickness and mechanical strength of the film.

The invention also proposes a method of manufacturing a seat cushion as claimed above, this method consisting in supplying a plastics material that can be expanded into a mold in the shape of the cushion to be made, placing in said mold, on a wall corresponding to the lower face of said cushion, a protective film of a material resistant to wear before supplying said plastics material that can be expanded into said mold, and causing said film to adhere to the supplied plastics material by virtue of chemical compatibility or by adhesive bonding by means of an appropriate adhesive.

It is of course advantageous for the material of the film to adhere naturally to the plastics material of the cushion. Failing this, it is sufficient to deposit a film of an appropriate adhesive material onto the face of the film that is to be in contact with the supplied plastics material that can be expanded before placing the film in the mold.

The invention enables economic manufacture of an expanded plastics material seat cushion with a lower face which has a covering of durable appearance and which is resistant to abrasion and which can be applied to a supporting frame without being damaged thereby.

The invention therefore applies to all seat cushions made of an expanded plastics material and more particularly to cushions which form part of a folding automobile vehicle seat.

BRIEF DESCRIPTION OF THE DRAWING

Further features and advantages of the invention will be apparent from the following particular description of a preferred embodiment of the invention as illustrated in the corresponding accompanying drawing in which.

DESCRIPTION OF THE PREFERRED EMBODIMENT

This embodiment of a cushion in accordance with the invention, which is shown inverted so that its lower face is visible, forms part of a folding automobile vehicle seat and essentially comprises a part 10 molded from an expanded plastics material, for example polyurethane foam, comprising a seat part 12 of substantially rectangular or square shape joined on three sides to a peripheral rim 14.

Figure 1:
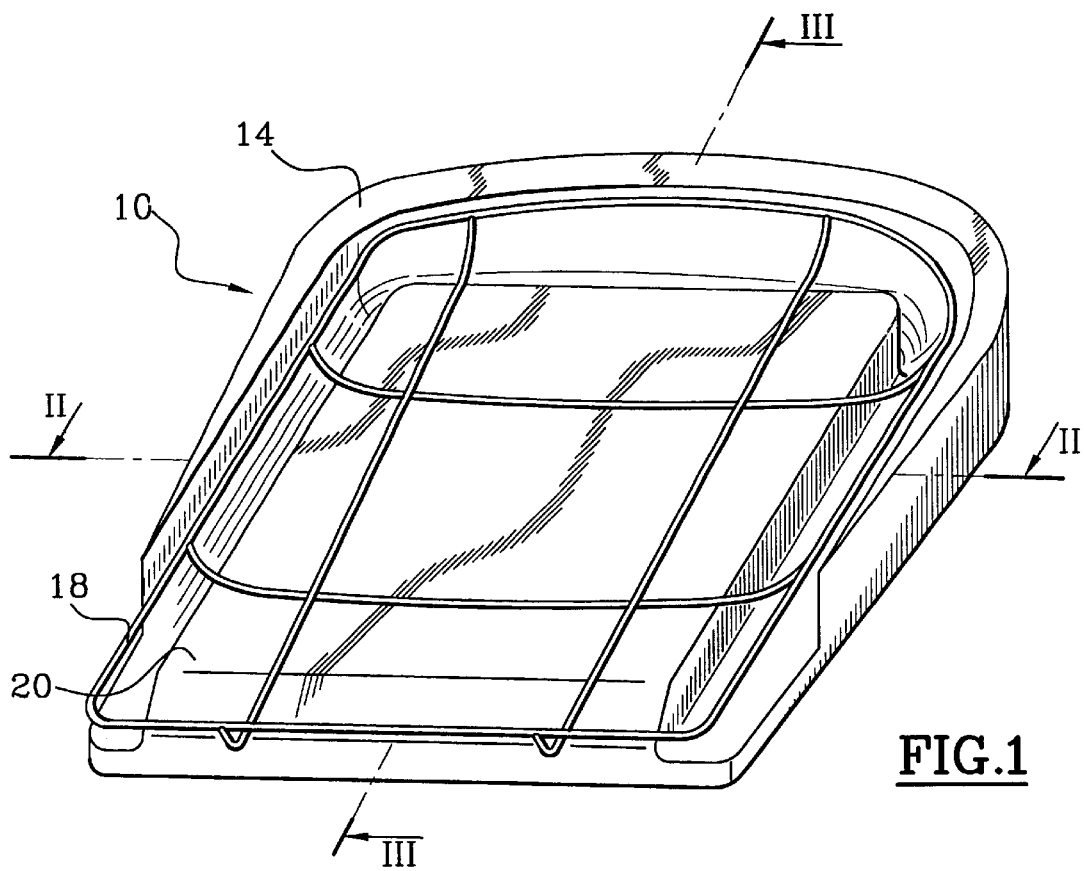
FIG. 1 is a diagrammatic perspective view of the lower face of a seat cushion in accordance with the invention.

The lower face 16 of the cushion is designed to be supported by a supporting frame 18 (shown diagrammatically in FIG. 1, but omitted in FIGS. 2 and 3) which is generally a grid made of metal wires having a diameter in the order of 6 mm and which is sufficiently strong to support the weight of a person sitting on the cushion. The grid is also used to staple on a cover of woven fabric or the like which covers the cushion.

In accordance with the invention, a strong and light protective film 20 covers the lower face 16 of the part 12 of the cushion and adheres to or is glued to all of the surface thereof, to protect it against mechanical damage (impact, rubbing on a rigid surface, etc) and to form a durable coating of clean appearance.

In the example shown, the film 20 is disposed between the frame 18 and the cushion part 12, protects the latter from rubbing on the frame 18 and prevents squeaks caused by the polyurethane foam rubbing on the frame.

The film is advantageously made of a thermoplastics material so that it can be heat-formed to the exact shape of the lower face 16 of the cushion part 12. To reduce the weight whilst retaining adequate thickness, the thermoplastics material is expanded. To improve its mechanical characteristics, the material can be reticulated, preferably by chemical agents or possibly by physical agents. In a prefered embodiment, reticulated expanded polyethylene is used having a density in the range from approximately 70 kg/m$^3$ to approximately 120 kg/n$^3$, preferably in the order of 90 kg/m$^3$, the thickness of the film 20 then being in the range from approximately 2 mm to approximately 3 mm. The density of the polyurethane foam forming the cushion is in this embodiment in the order of 40 kg/m$^3$ to 50 kg/m$^3$.

The method of manufacturing the cushion in accordance with the invention is as follows:

The protective film, which is available off the shelf in long lengths and with the required thickness, is passed through an oven in which it is quickly heated to its softening temperature, from where it is transferred to a heat-forming mold and then to a cutting press. Each heat-formed sheet is cut and then placed in a mold for manufacturing the cushion by pouring or injecting a plastics material that can be expanded, for example polyurethane. The softening of the surface of the material of the film 20 resulting from its heating in the mold and its contact with the poured or injected material encourages its adhesion to the material. When the film 20 is of reticulated expanded polyethylene and the cushion is of expanded polyurethane, they adhere totally at an interface temperature in the order of 100° C. to 120° C. in the mold without it being necessary to use an adhesive material.

If the materials of the film and the cushion are incompatible or their adhesion is defective, a film of an appropriate adhesive material is deposited onto the face of the film 20 that is to come into contact with the material of the cushion, the film is then placed in the mold and the plastics material which can be expanded is poured or injected into the mold, as mentioned above.

Figure 3:
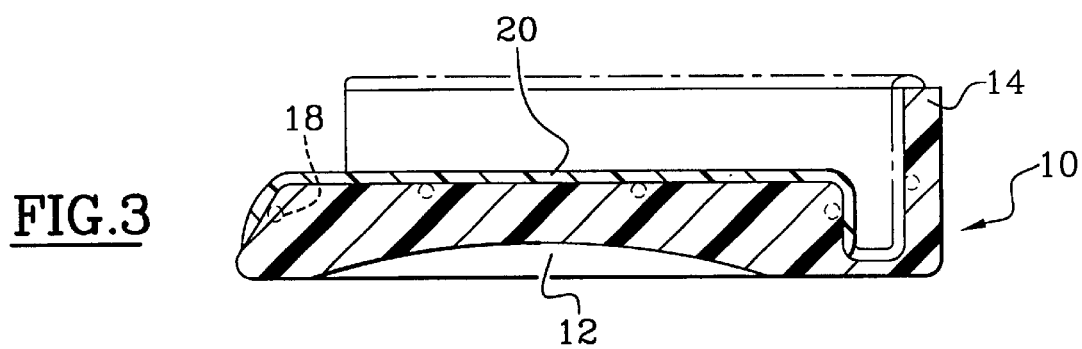
FIG. 3 is a transverse cross section of a second embodiment of the invention corresponding to a view taken along line III—III of FIG. 1.

In a different embodiment of the invention and as shown in FIG. 3, the supporting frame 18 is embedded within the cushion material instead of being applied to its lower face 16 or to the film 20. In this case, to manufacture the cushion, the first step is to place the heat-formed film 20 in the mold, after which the frame is placed in the mold in the required manner relative to the film and the plastics material that can be expanded is poured or injected into the mold.

In all cases, after reticulating the material that can be expanded, the mold is opened and the unit assembly comprising the film 20 and the cushion 10 is removed.

The film 20 can cover the lower face 16 of the seat part 12 of the cushion and at least part of the flanks of the part 12, as shown in the drawing.

Figure 2:
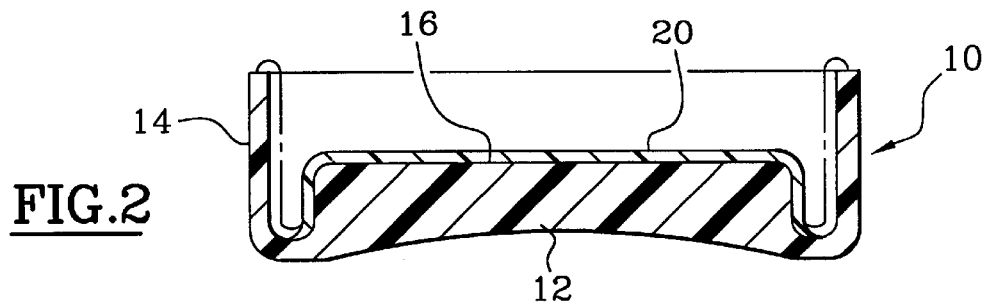
FIG. 2 is a longitudinal sectional view taken along line II—II of FIG. 1.

Alternatively, it can also cover all or part of the lower face of the peripheral rim 14, as shown in chain-dotted line in FIGS. 2 and 3.

What I claim is :

1. A seat cushion, in particular for automobile vehicles, made of an expanded synthetic plastic material and having a lower face adapted to be supported by a supporting frame, wherein at least part of the lower face of the cushion is covered with a protective film of synthetic plastic material that is resistant to wear and which adheres to the expanded synthetic plastic material of the cushion.

2. The cushion claimed in claim 1, wherein said film is made of an expanded synthetic plastic material.

3. The cushion claimed in claim 2, wherein said expanded material of said film has a density in the range from approximately 70 kg/M$^3$ to approximately 120 kg/m$^3$, and a thickness in the range from about 2 mm to about 3 mm.

4. The cushion claimed in claim 1, wherein said film is heat-formed.

5. The cushion claimed in claim 1, wherein said expanded material of said cushion and said material of said film are chemically compatible.

6. The cushion claimed in claim 1, wherein said film is adhered to said cushion by means of a film of adhesive material.

7. The cushion claimed in claim 1, wherein said frame is applied to the lower face of said cushion and said film is disposed between said frame and said expanded material of said cushion.

8. The cushion claimed in claim 1, wherein said frame is embedded in the expanded synthetic plastic material of the cushion.

9. The cushion claimed in claim 1, wherein said cushion comprises expanded polyurethane, and wherein said film is made of reticulated expanded polyethylene.

10. The cushion claimed in claim 1, wherein said cushion comprises a part of a seat cushion of an automobile vehicle seat, in particular a folding seat.

11. A method of manufacturing a seat cushion comprising:

(a) supplying a synthetic plastic material that can be expanded into a mold in the shape of the cushion to be made;

(b) placing in said mold, on a wall corresponding to the lower face of said cushion, a protective film of a material resistant to wear before supplying said synthetic plastic material that can be expanded into said mold; and (c) causing said film to adhere to the supplied material by chemical compatibility or by adhesive bonding.

12. The method claimed in claim 11, wherein said film is heat-formed to a shape matching that of the lower face of the cushion to be made before placing it in said mold.

* * * * *